(12) United States Patent
Ford et al.

(10) Patent No.: US 6,634,810 B1
(45) Date of Patent: *Oct. 21, 2003

(54) FREE-SPACE MULTI-PORT WAVELENGTH ROUTER WITH BROAD WAVELENGTH PASSBANDS

(75) Inventors: Joseph Earl Ford, Oakhurst, NJ (US); David Thomas Neilson, Plainsboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/414,622

(22) Filed: Oct. 8, 1999

(51) Int. Cl.$^7$ ................................................. G02B 6/28
(52) U.S. Cl. ............................. 398/88; 398/82; 398/84; 398/79; 385/24; 385/15; 385/31; 385/33
(58) Field of Search ................................. 359/131, 130, 359/128, 129; 385/10, 24, 37, 15, 35, 36, 52

(56) References Cited

U.S. PATENT DOCUMENTS

| | | | |
|---|---|---|---|
| 5,999,672 A | * 12/1999 | Hunter et al. | 385/24 |
| 6,097,519 A | * 8/2000 | Ford et al. | 359/130 |
| 6,108,471 A | * 8/2000 | Zhang et al. | 359/129 |
| 6,204,946 B1 | * 3/2001 | Aksyuk et al. | 359/131 |
| 6,275,630 B1 | * 8/2001 | Yang et al. | 359/130 |
| 6,307,657 B1 | * 10/2001 | Ford | 359/130 |
| 6,337,935 B1 | * 1/2002 | Ford et al. | 359/115 |

* cited by examiner

Primary Examiner—Jason Chan
Assistant Examiner—David C. Payne

(57) ABSTRACT

A free space multiport wavelength router for directing channels of a received WDM optic signal to a plurality of output ports. The inventive router includes a lens which receives an incoming WDM signal and focuses the signal on a grating for angular displacement, as a function of wavelength, of the individual channels in the WDM signal. The angularly displaced channels are then collimated by the lens and provided to an array of optical elements. The array is oriented relative to the lens so that each element in the array receives and imparts an orthogonal displacement to a corresponding channel relative to the dispersement direction provided by the grating. The othogonally-dispersed channels are then reflected back to the grating and are output to select output optic fibers.

20 Claims, 7 Drawing Sheets

FREE-SPACE MULTI-PORT WAVELENGTH ROUTER WITH BROAD WAVELENGTH PASSBANDS

BACKGROUND OF THE INVENTION

1. Field of the Invention

The present invention pertains to wavelength routers for use in fiber optic communications systems and, more particularly, to a wavelength router for directing discrete channels in a wavelength division multiplexed (WDM) optical signal to select output optic ports.

2. Description of the Related Art

Wavelength routers have many applications in WDM networks and can be used, for example, as a single input port device to demultiplex wavelength channels. Such routers can also be used as a multi-input device 10 as shown in FIG. 1 for providing wrap-around routing to output ports, as is known in the art, and for interconnecting nodes of a network. For example, device 10 in FIG. 1 has an equal number of input ports 12 (shown as A, B, C, and D) and output ports 14. When a WDM signal λ having wavelengths λ1, λ2, λ3, λ4 is input to the router through input fiber A, the wavelengths are routed, as shown, such that λ1 is output on output fiber 14A, λ2 on output fiber 14B, etc. For wrap-around routing the input signal λ is provided on a different input port (e.g. port 12B), in which case output port 14B receives channel λ1, output port 14C receives λ2, output port 14D receives λ3 and output port 14A receives λ4.

Presently, N×N routers having an equal number of input ports, output ports and wavelengths are constructed using a planar waveguide structure such as an arrayed waveguide grating or Dragone router. Such routers, however, do not operate with multimode fibers or multimode waveguide systems, thereby limiting their utility in local area network applications. Moreover, such routers do not accommodate broad wavelength channels, thus requiring the use of costly narrow and precise lasers for proper operation.

SUMMARY OF THE INVENTION

The present invention is directed to a multi-port wavelength router for directing a WDM optical signal having a plurality of adjacent-in-wavelength channels to select output ports. The WDM signal is provided by or to an input port, which is preferably a linear array of optic fibers, and is directed to a lens. The lens collimates the received WDM signal onto a planar grating which demultiplexes the channels in a first direction by providing angular separation along a first direction to the channels as a function of the channel wavelengths. The demultiplexed signal is directed back through the lens for focusing and then provided to an array of optical elements. The optical element array is positioned so that each element receives a channel, imparts to that channel a spatial displacement along a second direction, and directs the displaced channel back through the lens for re-collimation on the grating. The first direction angular displacement is cancelled out by the grating through the second pass and the spatially displaced channels are then reflected back to the lens which focuses the channels to the output ports. In this embodiment, a linear array of input fibers oriented along the first direction can be used to rout the discrete channels to a two-dimensional array of output fibers.

In another embodiment, an N×N router having an equal number of output ports and input ports is realized by providing an additional second displacement to the channels in a direction angularly offset from the second direction. This is accomplished through use of a reflective element which causes a second pass to occur through the router before the displaced channels are provided to the output ports.

As an alternative to a second pass through a single router, a second router stage positioned at an angle relative to the optical axis of the first router stage may be employed. This further embodiment allows the use of a planar surface device, such as a modulator or add/drop element, disposed between the two router stages to thereby allow for selective manipulation of the individual channels.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
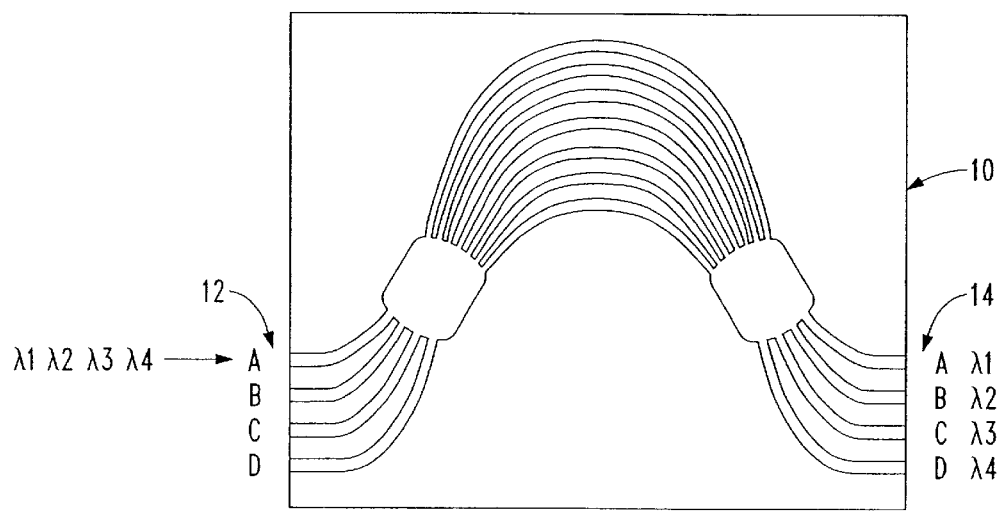
FIG. 1 is a two-dimensional depiction of a prior art N×N router.
Figure 2A:
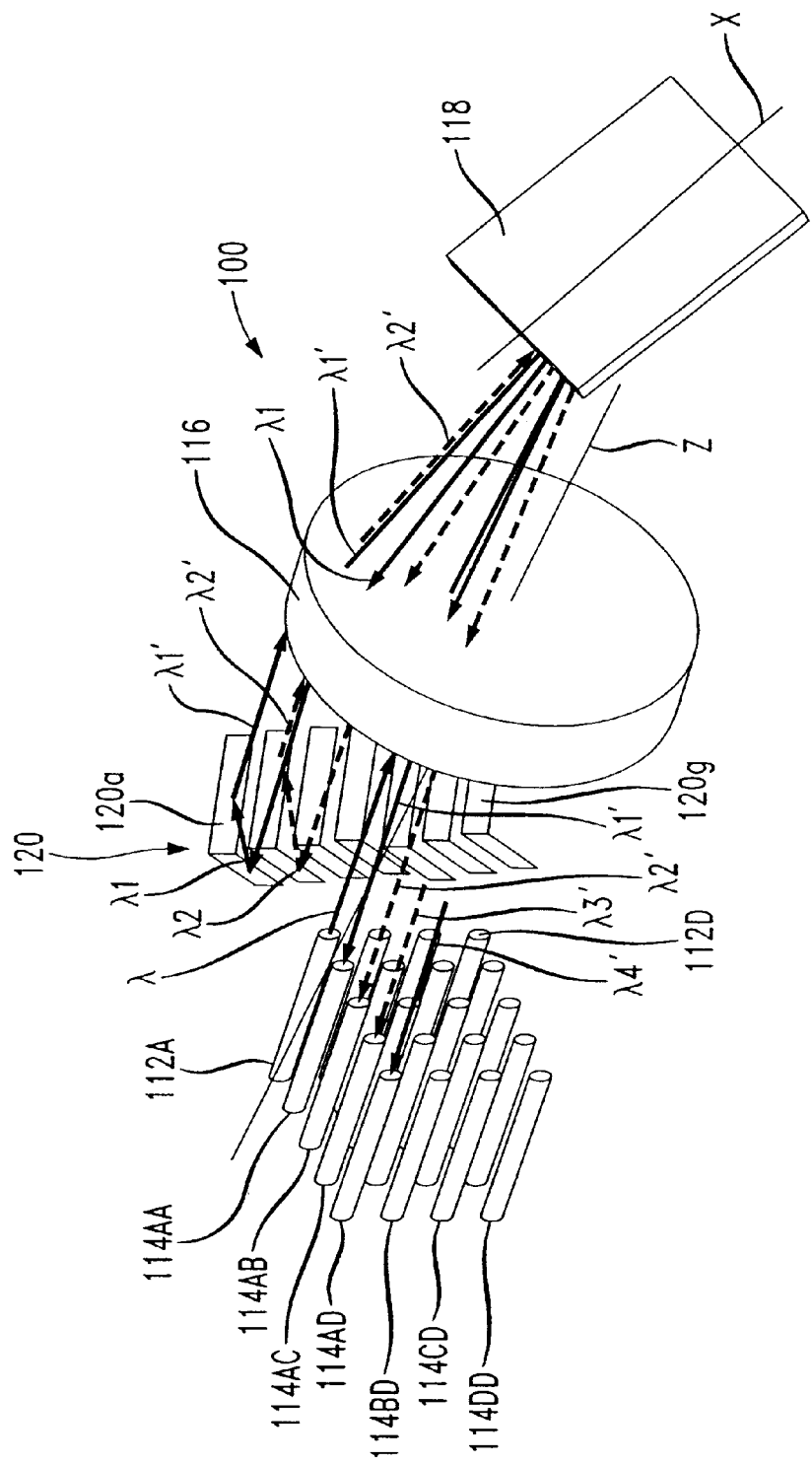
FIG. 2A is a diagrammatic view of a three-dimensional multi-port wavelength router in accordance with a currently preferred embodiment of the present invention.

Turning now to FIG. 2A, a multi-port router 100 is depicted having an optical axis Z for demultiplexing and routing a WDM signal λ provided by or to one of a plurality of input ports 112 to a plurality of output ports 114. The input and output ports are fed by or connected to optical fibers. The terms "fiber" and "port" are used interchangeably herein. As shown, the input signal λ includes a plurality of multiplexed channels (e.g. λ1, λ2, λ3, λ4) and is fed by an input fiber in a linear array of fibers, shown as a vertical array of fibers 112A, 112B, 112C and 112D. In FIG. 2A, fiber 2A is shown, by way of illustrative example, providing signal λ to router 100 but, as explained more fully below, the remaining input fibers (fibers 112B, 112C and 112D) can also be used.

The input multiplexed signal λ is directed to a lens 116 which focuses the signal onto a grating 118. Lens 116 operates, as is known in the art, to collimate or focus optic signals as a function of the direction of traverse through the lens. In particular, a signal passing through lens 116 in a forward direction toward grating 118 will be collimated on the grating, and a signal passing through lens 116 in a reverse direction away from the grating will be focused. Grating 118 is a planar grating which demultiplexes the input signal into the discrete channels. This is accomplished by providing angular dispersement to the individual channels in an amount proportional to each channel's wavelength. Grating 118 has a dispersement axis (X) along which the angular dispersement is oriented. For example, if axis (X) is defined in a vertical direction, then vertical angular dispersement will be provided to the channels. After signal $\lambda$ is demultiplexed by grating 118, lens 116 focuses the channels to produce a linear-parallel array of the channels in a first direction which, for a vertical grating axis, will result in a vertically-oriented parallel array of channels ($\lambda 1'$, $\lambda 2'$, $\lambda 3'$, $\lambda 4'$).

Router 100 includes an optical element array 120 for receiving and imparting displacement to each collimated channel in a second direction which is, preferably, orthogonal to the first direction of angular displacement imparted by grating 118. For example, for a vertical angular displacement by grating 118, optical element array 120 will provide horizontal displacement to the collimated channels. Optical element array 120 includes a plurality of optical elements (seven of which are shown as elements 120a–120g) and which are optically reflective, such as mirrors or prisms.

Figure 3C:
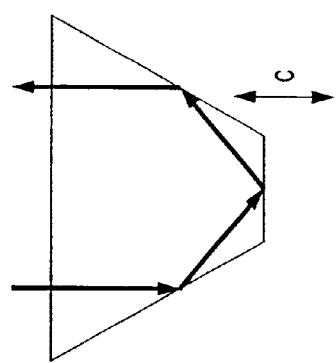
FIGS. 3A–3C depict alternative optical element designs for use in the router of FIG. 2A.
Figure 3B:
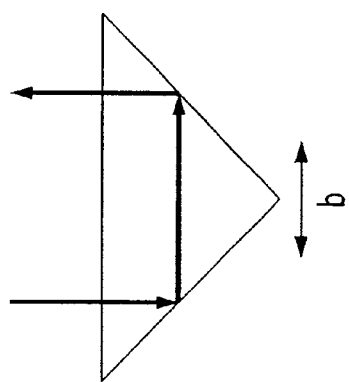
Figure 3A:
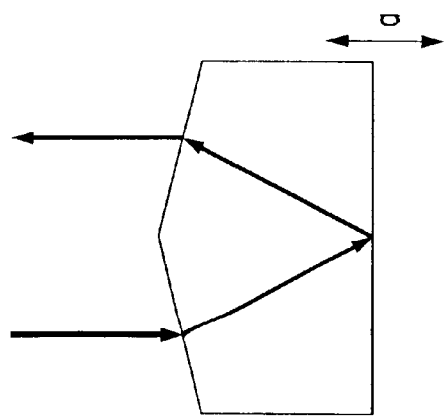

FIGS. 3A–3C depict alternative currently preferred optical element designs that may be employed in array 120. It is preferred that the optical element array be constructed of like-optical elements. Each optical element design is shown receiving a channel in a forward direction from lens 116 and imparting orthogonal dispersion to the received channel relative to the forward direction. Thus, and as shown, each optical element receives a channel or wavelength at a location on the surface, imparts orthogonal displacement to the channel, and outputs the channel at a surface location different than the location of input. Each optical element position in the array is located, relative to the position of other optical elements in the array, to provide a different and distinct orthogonal shift to the received channel. This is accomplished by positioning each optical element to receive a corresponding channel at a different location than the point of receipt of channels by other optical elements in the array.

For example, and with reference to FIG. 3B, the amount of orthogonal displacement can be adjusted (either increased or decreased from the displacement shown, by way of example in FIG. 3B) by moving the optical element in a direction along directional arrow b, which is in a direction orthogonal to the optical axis Z. On the other hand, for the optical element designs depicted in FIGS. 3A and 3C, adjustment of the disbursement amounts is accomplished by moving the optical elements in a transverse direction relative to optical axis Z, i.e. along the directional arrows a and c, respectively. As should be appreciated, other optical element designs can be used to provide the desired displacement by designing the optical element array 120 in a desired manner, so that each collimated channel $\lambda 1'$, $\lambda 2'$, $\lambda 3'$, $\lambda 4'$ will be received and reflected by a separate corresponding optical element, with each resulting reflected channel having a different orthogonal displacement relative to the other channels in the multiplexed signal $\lambda$.

Once orthogonally displaced by mirror array 120, the channels are re-directed or sent back to lens 116 for collimating on grating 118. Since the channels are not shifted by the optical element array 120 in the direction of the grating dispersion (i.e. in the direction of grating axis X), the effect of the grating is to cancel the angular dispersion that was imparted to the discrete channels prior to receipt by the optical element array 120. However, because the shift imparted to the channels by the individual optical elements in array 120 is orthogonal to the displacement by grating 118, such orthogonal displacement is not cancelled by the grating which re-directs the shifted channels to lens 116 for imaging on output fibers 114. As shown, the output fibers are arranged in a two-dimensional array having columns and rows.

Figure 6:
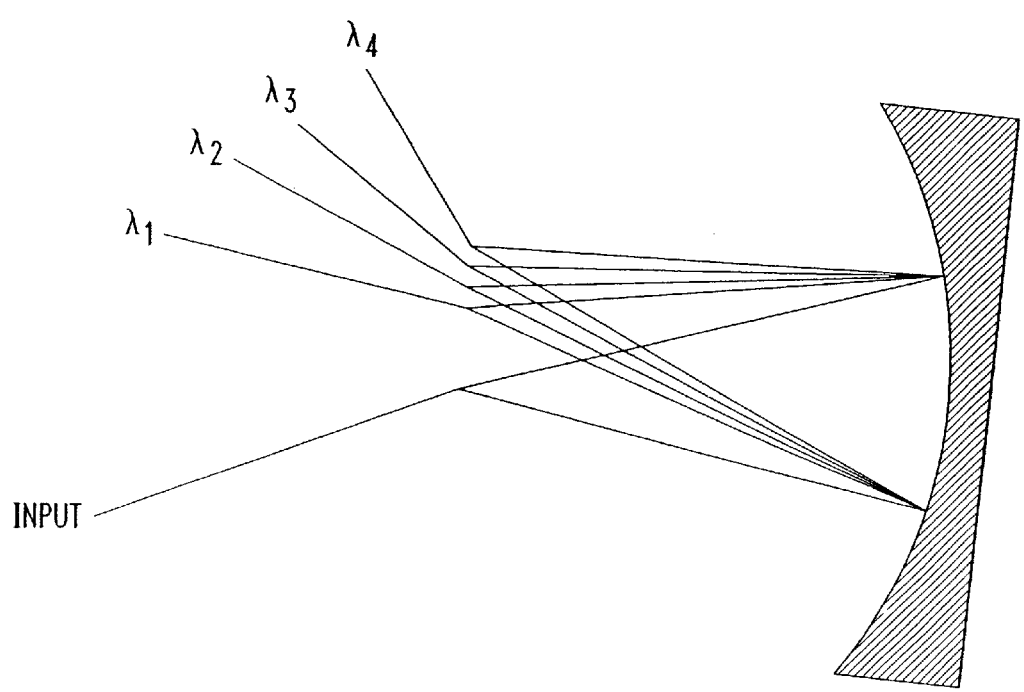
FIG. 6 depicts an integrally-formed grating and lens for use in another embodiment of the present invention.

Although the grating and lens are shown as separate elements, they can be integrally formed as a curved diffraction grating, as shown in FIG. 6.

FIG. 2A, depicts an array of sixteen output fibers arranged in four rows, with four fibers per row, that receives shifted channels provided by a WDM signal from an input linear fiber array having four input fibers (112A, 112B, 112C, 112D). Thus, and for the example shown in FIG. 2A, when input signal $\lambda$ having four channels is received from input fiber 112A, the channels are reflected by adjacent-in-space optical elements in array 120 such that channel $\lambda 1$ is displaced by optical element 120a, channel $\lambda 2$ is displaced by optical element 120b, etc. The reflected and displaced channels are then provided to adjacent optical output fibers positioned in a common row such that $\lambda 1'$ is output to output fiber 114AA, channel $\lambda 2'$ is output to output fiber 114AB, channel $\lambda 3'$ is output to fiber 114AC, and channel $\lambda 4'$ is output to fiber 114AD. If, on the other hand, a different input fiber is used to provide the input WDM signal $\lambda$, e.g. input fiber 112D, the channels will undergo wrap-around routing due to the design of the optical element array 120 and will then be received by adjacent optical elements corresponding to the input fiber displacement, e.g. $\lambda 1$ will be displaced by element 120d, and $\lambda 4$ will be displaced by element 120g. The output channels will then be provided to output fibers 114DD (for $\lambda 1'$), 114DA (for $\lambda 2'$), 114DB (for $\lambda 3'$) and 114DC (for $\lambda 4'$).

Figure 2B:
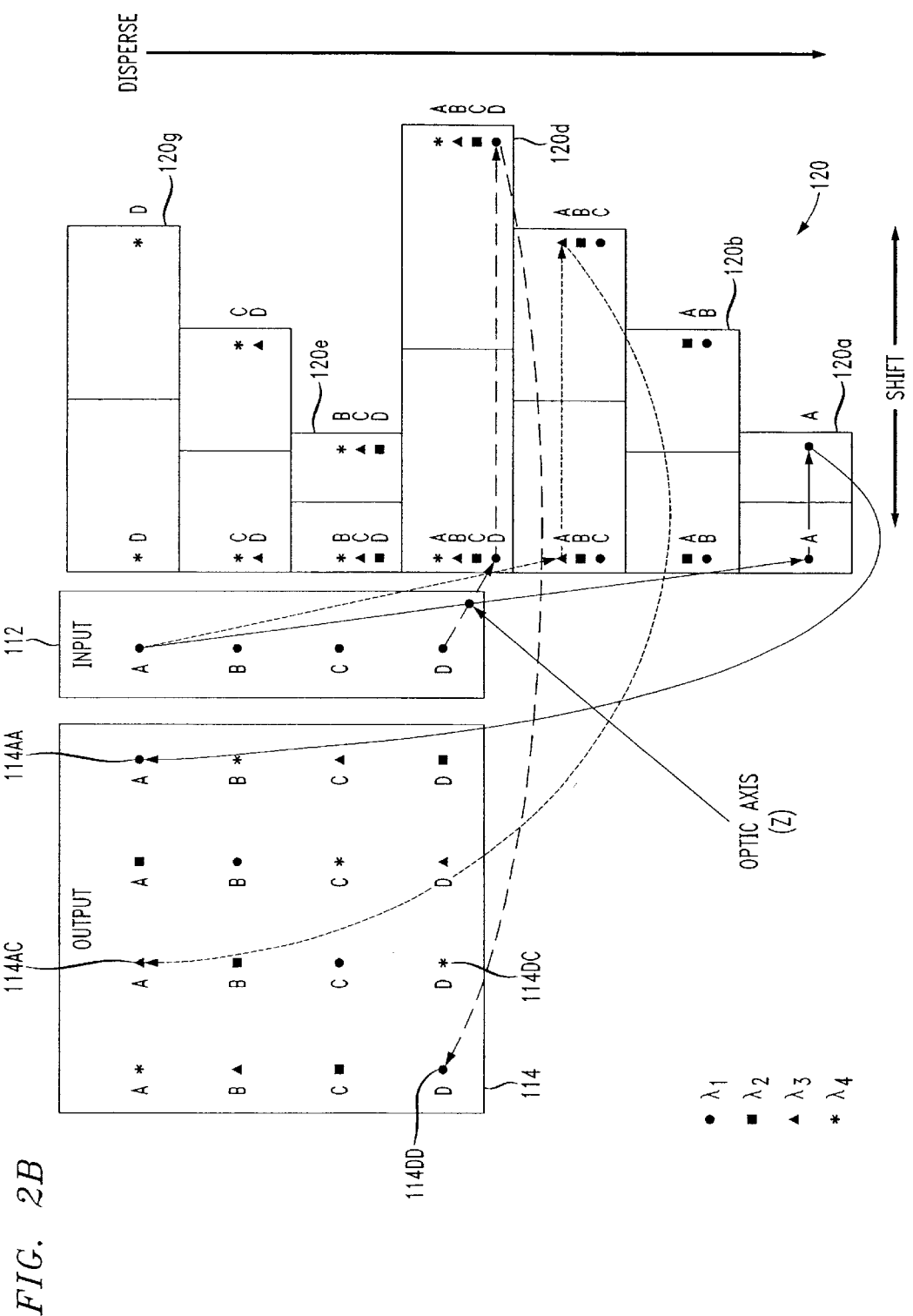
FIG. 2B is a mapping diagram for the router of FIG. 2A.

The mapping of the discrete channels in the input WDM signal is further illustrated with reference to FIG. 2B. In this figure, for an input signal received from input fiber 112A, channel $\lambda 1$ is provided to optical element 120a and output to output port 114AA. For example, when input signal $\lambda$ is provided from input fiber 112A, the output channels $\lambda 1$, $\lambda 2$, $\lambda 3$, and $\lambda 4$ are provided to output fibers 114AA, 114AB, 114AC, 114AD, respectively. If, on the other hand, the input signal is received from input fiber 112D, then wrap-around displacement is provided by the optical elements in array 120 such that channel $\lambda 1$ is displaced by optical element 120d—which, as shown in FIG. 2B, provides the maximum displacement in the array—and is, consequently, provided to output fiber 114DD, whereas channel $\lambda d$ is provided to output fiber 114DA, channel $\lambda 3$ to output fiber 114DB and channel $\lambda 4$ to fiber 114DC.

The router 100 is thus useful for demultiplexing signals from an array of input fibers and directing them to a two-dimensional fiber array. The displaced channels can be directed to a two-dimensional array of waveguides or surface-normal devices such as detectors or modulators. The device can also be used to multiplex signals from an array of fibers, waveguides or wavelength chirped vertical cavity lasers, or bars of edge emitting lasers.

As should be apparent from the foregoing, router 100 has arbitrary wavelength passbands dictated by the design of the optical element array 120 which, in the preferred embodiment, could be as wide as 20 nm as opposed to the 0.4 nm width of waveguide grating routers. As such, lasers having poorly defined spectral properties—such as uncooled Fabry-Perot type diode lasers—can be used, thereby resulting in a reduction of equipment and operating costs.

Figure 4:
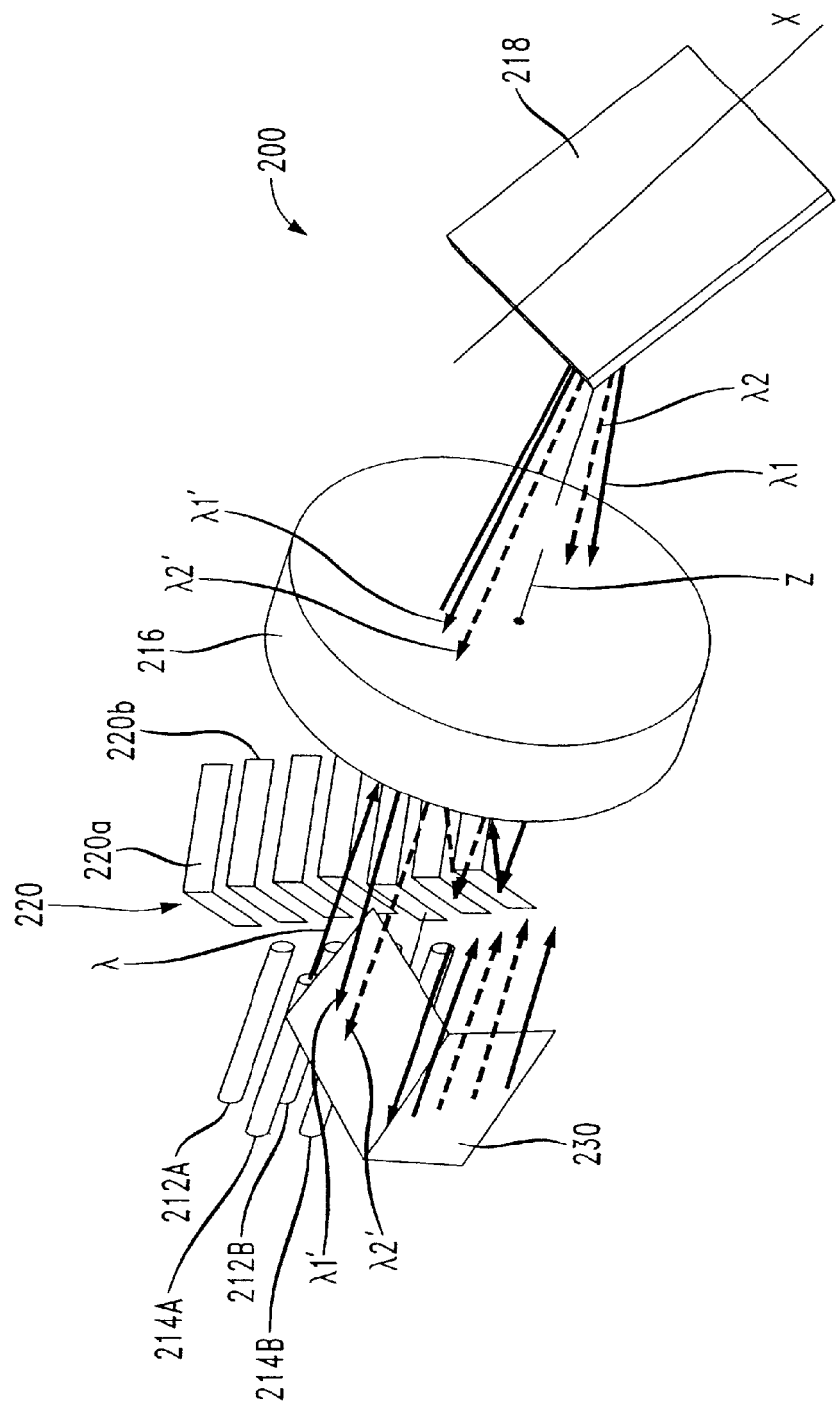
FIG. 4 is a diagrammatic view of an N×N router in accordance with another embodiment of the present invention.

With reference now to FIG. 4, the router 100 of FIG. 2A can be readily modified to provide an N×N router 200 having an equal number of input ports, outputs and channels. Thus, for example, router 200 is shown having four input ports 212A, 212B, 212C, 212D, and four output ports 214A, 214B, 214C, 214D for routing a WDM signal λ having four channels λ1, λ2, λ3, λ4. The modification to router 200 is provided by an additional optical reflective element 230 which is preferably a pair of image inversion mirrors or prisms disposed at right angles relative to each other and positioned at a diagonal to the optical axis of router 200, i.e. at a 45° angle relative to optical axis Z. The optical reflective element 230 transposes the relative channel positions—from the positions described in FIG. 2A above—and causes the transposed channels to traverse router 200 for a second pass. The final output is then directed back to the original input port array 212. In the alternative, by designing optical reflective element 230 with an offset, the transposed channels can be directed into the output port array 214 disposed adjacent the input array.

Figure 5:
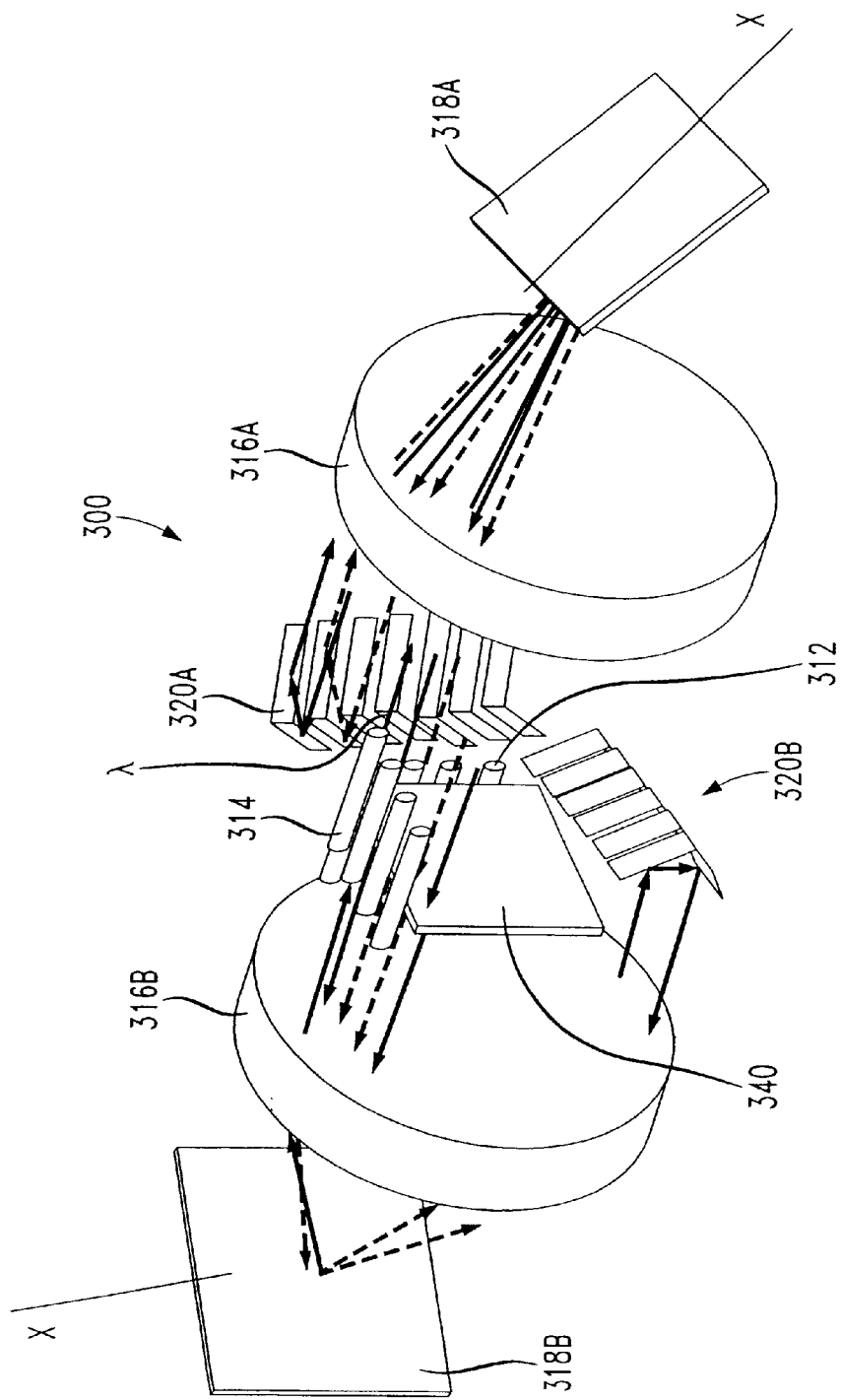
FIG. 5 depicts another embodiment of the N×N router of FIG. 4.

In yet another embodiment, the N×N single router with double-pass configuration 200 including a single lens 216, single optical element array 220 and single grating 218 can be constructed as a router 300 using two similar router stages, as for example shown in FIG. 5. Each router stage includes a respective lens 316A, 316B, respective optical element array 320A, 320B, and a respective grating 318A, 318B. The router stages are disposed, oriented or rotated by 90° with respect to each other so that the axes of the gratings 318A, 318B are orthogonal to each other.

During operation, input WDM signal λ is provided to the first stage of router 300 through lens 316A, is collimated on grating 318A whereupon the individual channels are angularly dispersed, is focused by lens 316A and is provided to optical element array 320A for a first orthogonal displacement. The displaced channels are then provided to lens 316A for collimated on grating 318A whereupon the angular displacement is cancelled, and provided back to lens 316A for conveyance to the second router stage. The second router stage receives the channels through lens 316B, angularly displaces the channels via grating 318B, and orthogonally displaces the channels through second optical element array 320B. The resulting displaced channels are then forwarded to output ports 314 through grating 318B and lens 316B.

Although the employment of such a duplicative system is more costly than the single or "folded" N×N router of FIG. 4, it does provide additional benefits. In particular, a surface device 340 can be placed between the output of the first router stage and the input of the second router stage to provide selective manipulation of individual channels. The surface device 340 may provide modulation or add/drop functions for select channels, as is known in the art.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A free space multiport wavelength router for directing a WDM optical signal having a plurality of discrete adjacent-in-wavelength channels and received from an input optic port to a plurality of output optic ports, said router having an optical axis and comprising:

an optical diffraction grating having a periodic structure and being oriented in a substantially perpendicular direction relative to a first direction;

a lens for receiving the WDM optical signal from the input optic port and for collimating the signal on said grating, said grating providing angular displacement, in the first direction relative to the optical axis, to the discrete channels as a function of the wavelength of each discrete channel and directing said angularly-displaced discrete channels to said lens for focusing said angularly displaced discrete channels; and an array of optical elements arranged along the first direction and positioned for receiving, at each optical element, a select one of said angularly-displaced discrete channels, each optical element producing a corresponding spatial shift along a second direction substantially orthogonal to the first direction for imparting an associated spatial shift to each received discrete channel and for directing each spatially-shifted channel to a separate output port.

2. The free space multi-port wavelength router of claim 1, wherein each optical element in said array comprises at least two mirrors.

3. The free space multi-port wavelength router of claim 1, wherein each optical element in said array comprises at least two refractive surfaces with a reflector disposed between said surfaces.

4. The free space multi-port wavelength router of claim 1, wherein the amount of spatial shift along the second direction imparted by each optical element to a corresponding received channel is dictated by the relative position of said each optical element with respect to the dispersed input signal.

5. The free space multi-port wavelength router of claim 1, wherein said array of optical elements directs the spatially-shifted channels through said lens to said grating, whereupon the first displacement is removed and the spatially-shifted channels are directed through said lens to an array of output optic fibers.

6. The free space multi-port wavelength router of claim 1, wherein a first pass of channels through said router is defined by input of said WDM optical signal to said lens and output of said spatially-shifted channels from said lens, said router further comprising an optical reflective element positioned for receiving said spatially-shifted channels from said lens after said first pass and for reflecting said received spatially-shifted channels back to said lens, said grating and said array for providing said spatially-shifted channels to a plurality of input fibers.

7. The free space multi-port wavelength router of claim 1, wherein a first pass of channels through said router is defined by input of said WDM optical signal to said lens and output of said spatially-shifted channels from said lens, said router further comprising an optical reflective element positioned for receiving said spatially-shifted channels and for further spatially-shifting said channels to form double spatially-shifted channels, and for reflecting said double spatially-shifted channels back to said lens, said grating and said array for providing said double spatially-shifted channels to the plurality of output fibers.

8. The free space multi-port wavelength router of claim 7, wherein said optical reflective element is positioned at about a 45° angle relative to the first direction.

9. The free space multi-port wavelength router of claim 1, wherein said grating and said lens are integrally formed.

10. A free space N×N wavelength router for directing a WDM optical signal having a group of N discrete adjacent-in-wavelength channels received from one of N input optic ports to a group of N output optic ports, said router having an optical axis and comprising:
   an optical diffraction grating having a periodic structure and being oriented in a substantially perpendicular direction relative to a first direction;
   a lens for receiving the WDM optical signal from one of said input optic ports and for collimating the signal on said grating, said grating providing angular displacement, in the first direction relative to the optical axis, to the discrete channels as a function of the wavelength of each discrete channel and directing said angularly-displaced discrete channels to said lens for focusing said angularly displaced discrete channels;
   an array of optical elements arranged along the first direction and positioned for receiving, at each optical element, a select one of said angularly-displaced discrete channels, each optical element producing a corresponding spatial shift along a second direction substantially orthogonal to the first direction for imparting an associated spatial shift to each received discrete channel and for directing each spatially-shifted channel to said grating and to said lens for defining a first pass of said channels through said router; and
   a reflective optical element for receiving said spatially shifted channels from said lens and for directing said channels back to said lens, said grating and said array, so as to cause a second pass of said channels through said router and an output of said spatially-shifted channels from said second pass to one of said group of said N input fibers and said group of said N output fibers.

11. The free space N×N wavelength router of claim 10, wherein said reflective optical element provides a second spatial shift to said spatially shifted channels.

12. The free space N×N wavelength router of claim 10, wherein each optical element in said array comprises at least two mirrors.

13. The free space N×N wavelength router of claim 10, wherein each optical element in said array comprises at least two reflecting surfaces with a reflector disposed between said surfaces.

14. The free space N×N wavelength router of claim 10, wherein the amount of spatial shift along the second direction imparted by each optical element to a corresponding received channel is dictated by the relative position of said each optical element with respect to the dispersed input signal.

15. The free space N×N wavelength router of claim 10, wherein said array of optical elements directs the spatially-shifted channels through said lens to said grating, whereupon the first displacement is removed and the spatially-shifted channels are directed through said lens to an array of output optic fibers.

16. A free space N×N wavelength router for directing a WDM optical signal having a group of N discrete adjacent-in-wavelength channels received from one of N input optic ports to a group of N output optic ports, said router having an optical axis and comprising:
   a first router stage having:
      a first optical diffraction grating having a periodic structure and being oriented in a substantially perpendicular direction relative to a first direction;
      a first lens for receiving the WDM optical signal from one of said input optic ports and for collimating the signal on said grating, said grating providing angular displacement, in the first direction relative to the optical axis, to the discrete channels as a function of the wavelength of each discrete channel and directing said angularly-displaced discrete channels to said first lens for focusing said angularly-displaced discrete channels;
      a first array of optical elements arranged along the first direction and positioned for receiving, at each optical element, a select one of said angularly-displaced discrete channels, each optical element producing a corresponding spatial shift along a second direction substantially orthogonal to the first direction for imparting an associated spatial shift to each received discrete channel and for directing each spatially-shifted channel to said grating and to said lens for defining a first pass of said channels through said router; and
   a second router stage positioned at an angle relative to an optical axis of said first router stage and having:
      a second optical diffraction grating having a periodic structure and being oriented in a substantially perpendicular direction relative to a third direction;
      a second lens for receiving the spatially shifted channels from said first router stage and for collimating the spatially shifted channels on said grating, said grating providing second angular displacement, in the third direction which is angularly offset from said first direction, to the spatially shifted channels as a function of the channel wavelengths and directing said second angularly-displaced discrete channels to said second lens for focusing said angularly displaced discrete channels; and
      a second array of optical elements arranged along the third direction and positioned for receiving, at each optical element, a select one of said second angularly-displaced discrete channels, each optical element producing a corresponding spatial shift along the third direction substantially orthogonal to the third direction for imparting an associated spatial shift to each received discrete channel and for directing each spatially-shifted channel to said second grating, to said second lens and to the output ports.

17. The free space N×N wavelength router of claim 16, wherein each optical element in said first and said second arrays comprises at least two mirrors.

18. The free space N×N wavelength router of claim 16, wherein each optical element in said first and said second arrays comprises at least two refracting surfaces having a reflector disposed between the surfaces.

19. The free space N×N wavelength router of claim 16, wherein the amount of spatial shift along the second direction imparted by each optical element in said first array to a corresponding received channel is dictated by the relative position of said each optical element with respect to the signal received by said first lens, and wherein the amount of spatial shift along the third direction imparted by each optical element in said second array to a corresponding received channel is dictated by the relative position of said each optical element with respect to the signal received by said second lens.

20. The free space N×N wavelength router of claim 16, further comprising a planar optical element disposed between said first and said second router stages for acting on the channels in said WDM signal.

\* \* \* \* \*